(12) United States Patent
Baigal

(10) Patent No.: US 9,509,512 B1
(45) Date of Patent: Nov. 29, 2016

(54) MESSAGE DIGEST GENERATOR

(75) Inventor: Steven Baigal, Clarksburg, MD (US)

(73) Assignee: Marvell International Ltd., Hamilton (BM)

(*) Notice: Subject to any disclaimer, the term of this patent is extended or adjusted under 35 U.S.C. 154(b) by 1076 days.

(21) Appl. No.: 12/001,457

(22) Filed: Dec. 11, 2007

Related U.S. Application Data

(60) Provisional application No. 60/871,546, filed on Dec. 22, 2006.

(51) Int. Cl.
  *H04K 1/00* (2006.01)
  *H04L 9/00* (2006.01)
  *H04L 9/28* (2006.01)
  *H04L 9/32* (2006.01)

(52) U.S. Cl.
  CPC ....................... *H04L 9/32* (2013.01)

(58) Field of Classification Search
  CPC ........................................................ H04L 9/32
  USPC ......... 713/187, 189–194; 726/27–33; 380/28
  See application file for complete search history.

(56) References Cited

U.S. PATENT DOCUMENTS

| | | | |
|---|---|---|---|
| 5,051,745 A | 9/1991 | Katz | |
| 7,142,669 B2 * | 11/2006 | Dworkin et al. | 380/28 |
| 8,041,957 B2 * | 10/2011 | Michaelis et al. | 713/187 |
| 2007/0011454 A1 * | 1/2007 | Chien et al. | 713/168 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.
IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.
IEEE Std 802.16-2001™, IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Apr. 8, 2002; 349 pages.

(Continued)

*Primary Examiner* — Dant Shaifer Harriman

(57) ABSTRACT

A message digester includes an append bits module that appends padding bits to a message, an append length module that appends length data to the message, the length data representing an amount of data in the message, an initialization module that stores predetermined values in buffers, an array that stores constants, and a looping message-digest calculation module that generates a message digest based on the message, padding bits, length data, the predetermined values in the buffers, and the constants.

25 Claims, 8 Drawing Sheets

(56) References Cited

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor Jan. 2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

Network Working Group Request for Comments: 1321; MIT Laboratory for Computer Science and RSA Data Security, Inc.; http://www.ietf.org/rfc/rfc1321.txt; Apr. 1992; 21 pages.

Md5.h; Aladdin Enterprises; copyright 1999; 2 pages.

Md5main.c; Aladdin Enterprises; copyright 2002; 3 pages.

Md5.c; Aladdin Enterprises; copyright 1999; 7 pages.

* cited by examiner

MESSAGE DIGEST GENERATOR

CROSS-REFERENCE TO RELATED APPLICATIONS

This application claims the benefit of U.S. Provisional Application No. 60/871,546, filed on Dec. 22, 2006. The disclosure of the above application is incorporated herein by reference in its entirety.

FIELD

The present disclosure relates to generating message digests based on messages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networked computer applications require a client to connect to a server that hosts an application. In some of those applications, such as voice over internet protocol (VoIP) telephony, Internet games, movie and music subscriptions, and the like, the client has a unique identifier and employs a session initiation protocol (SIP) to connect to the server. The SIP can employ a standard hashing or message digest algorithm to verify the client's identity. One standard message digest algorithm is known as "MD5". MD5 is described in detail in Internet Engineering Task Force (IETF) Request for Comments (RFC) 1321, which is hereby incorporated by reference in its entirety.

The MD5 algorithm takes as input a message of arbitrary length and produces as output a 128-bit "fingerprint" or "message digest" of the input. It is conjectured that it is computationally infeasible to produce two messages having the same message digest, or to produce any message having a given prespecified target message digest. The MD5 algorithm can be employed in digital signature applications to verify the identity of a client.

Referring now to FIG. 1, a functional block diagram depicts a computer network 10 that employs MD5. Network 10 includes a network device 12 that communicates with a server 14 via an internet 16. Examples of a network device 12 include a VoIP telephone, a gaming console, a computer, a television, a digital sound recording player, and the like. Network device 12 executes application layer software that includes a message digest module 20. Message digest module 20 calculates a message digest for network device 12 and sends the message digest to server 14. The message digest is based on a message and uniquely identifies network device 12.

Examples of messages include data that is unique to associated users such as e-mail addresses, account numbers, software serial numbers, and the like. The message can also include all or part of digital files and/or memory locations that are included in network device 12 and a challenge 32 that is described below. Server 14 calculates a message digest based on the message and compares it to the message digest from network device 12. If the message digests match then network device 12 is authorized to use services of server 14. In some embodiments server 14 communicates a challenge phrase to network device 12. The message can then also include the challenge phrase and message digest module 20 then calculates the message digest based in part on the challenge phrase.

Message digest module 20 includes several modules that implement associated steps of RFC 1321. An append bits module 22 appends padding bits to the message in accordance with RFC 1321 §3.1. An append length module 24 appends a 64-bit representation of b to the padded message, where b is the length of the message before the padding bits were added. An initialization module 26 initializes four 32-bit wide, i.e. word, buffers or registers in accordance with RFC 1321 §3.3. The registers are designated as A, B, C, and D and contain the message digest as it is being calculated. A sequential MD5 calculation module 28 processes the padded message appended with the 64-bit representation of b, hereinafter referred to as the complete message. The processing occurs in accordance with RFC 1321 §3.4. Results of the processes are accumulated in buffers A, B, C, and D, which also contain the final message digest after the last 16-bit block is processed.

Referring now to FIG. 2, a data diagram shows network messages that can flow between network device 12 and server 14 during the SIP. Network device 12 sends a registration request 30 to server 14. Server 14 then replies with a challenge 32, such as a pseudo-random number. Network device 12 generates a message digest 34 based on challenge 32 and the identifying data and sends the message digest to server 14. Server 14 compares the message digest from network device 12 to a second message digest that server 14 generated based on challenge 32 and a copy of the identifying data. If the message digests match then server 14 communicates an acknowledgement 36 to network device 12 and allows network device 12 to use a server application.

SUMMARY

A message digester includes an append bits module that appends padding bits to a message, an append length module that appends length data to the message, the length data representing an amount of data in the message, an initialization module that stores predetermined values in buffers, an array that stores constants, and a looping message-digest calculation module that generates a message digest based on the message, padding bits, length data, the predetermined values in the buffers, and the constants.

In other features the message digester further includes a first array that stores addresses of the buffers. The looping message-digest calculation module generates the message digest based on an accumulation of results in the buffers. The looping message-digest calculation module indexes into the first array based on (i+1) mod 4, where i is an integer. The constants include an index into the message. The constants include a transform. The constants include a shift quantity. The looping message-digest calculation module generates the message digest further based on the shift quantity. The buffers include four buffers that are each 32-bits wide. A voice over internet protocol (VOIP) headset includes the message digester.

A method of generating a message digest includes appending padding bits to a message, appending length data to the message, the length data representing an amount of data in the message, storing predetermined values in buffers, storing an array of constants, and generating a message digest in the buffers based on the message, padding bits, length data, the predetermined values, and the array of constants.

In other features the method includes storing addresses of the buffers. Generating the message digest includes accumulating results in the buffers. The method includes indexing into the first array based on (i+1) mod 4, where i is an integer. The constants include an index into the message. The constants include a transform. The constants include a shift quantity. Generating the message digest is further based on the shift quantity. The method includes storing 32-bits in each of four of the buffers. The method includes providing a voice over internet protocol (VOIP) headset that employs the message digest.

A message digester includes append bits means for appending padding bits to a message, append length means for appending length data to the message, the length data representing an amount of data in the message, initialization means for storing predetermined values in buffers, array means for storing an array of constants, and looping message-digest calculation means for generating a message digest based on the message, padding bits, length data, the predetermined values in the buffers, and the array of constants.

In other features the message digester further includes first array means for storing addresses of the buffers. The looping message-digest calculation means generates the message digest based on an accumulation of results in the buffers. The looping message-digest calculation means indexes into the first array based on (i+1) mod 4, where i is an integer. The constants include an index into the message. The constants include a transform. The constants include a shift quantity. The looping message-digest calculation means generates the message digest further based on the shift quantity. The buffers include four buffers that are each 32-bits wide. In other features a headset means for communicating via a voice over internet protocol (VOIP) includes the message digester.

A computer program executed by one or more processors provides a method of generating a message digest. The computer program can reside on a computer readable medium such as but not limited to memory, non-volatile data storage, and/or other suitable tangible storage mediums. The computer program includes appending padding bits to a message, appending length data to the message, the length data representing an amount of data in the message, storing predetermined values in buffers, storing an array of constants, and generating a message digest in the buffers based on the message, padding bits, length data, the predetermined values, and the array of constants.

In other features the computer program includes storing addresses of the buffers. Generating the message digest includes accumulating results in the buffers. The computer program includes indexing into the first array based on (i+1) mod 4, where i is an integer. The constants include an index into the message. The constants include a transform. The constants include a shift quantity. Generating the message digest is further based on the shift quantity. The computer program includes storing 32-bits in each of four of the buffers. The computer program includes providing a voice over internet protocol (VOIP) via a headset that employs the message digest.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
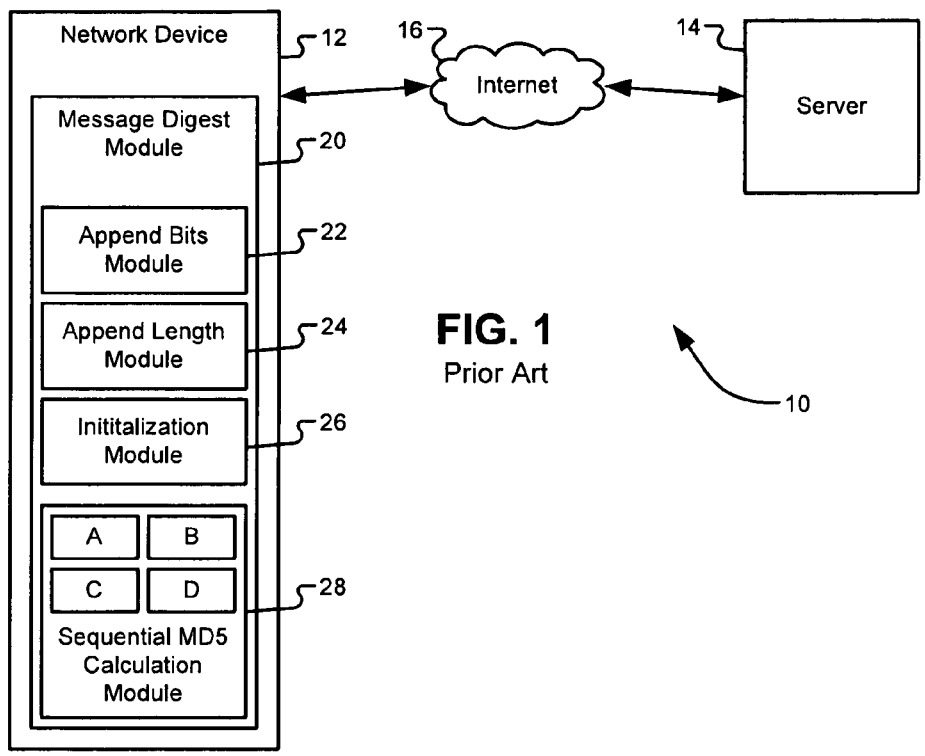
FIG. 1 is a functional block diagram of a communication system that employs message digests in accordance with the prior art.
Figure 2:
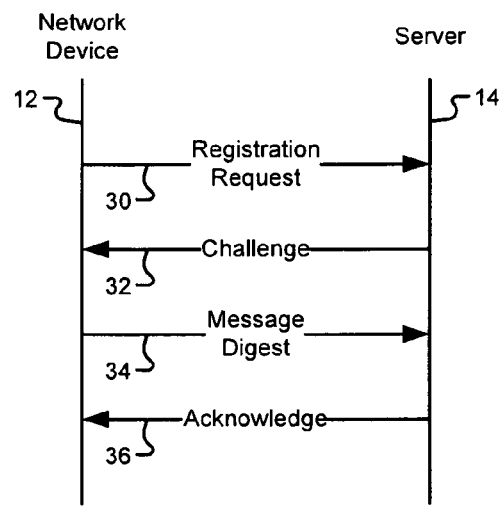
FIG. 2 is a communication diagram of a message digest based session initiation protocol in accordance with the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

For wireless network applications, please refer to IEEE standards 802.11, 802.11a, 802.11b, 802.11g, 802.11h, 802.11n, 802.16, and 802.20. Also refer to Bluetooth if applicable.

Figure 3A:
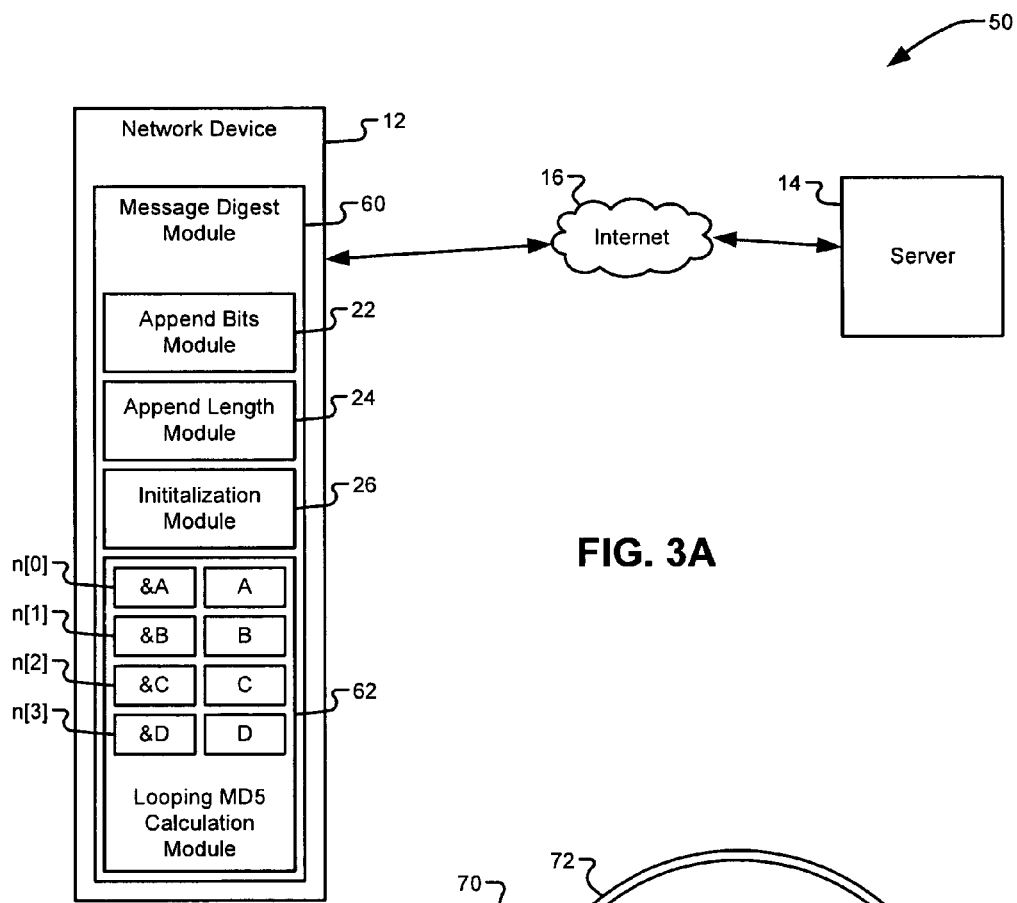
FIG. 3A is a functional block diagram of a communication system that employs a looping message digest 5 (MD5) calculation module according to the principles of the present disclosure.

Referring now to FIG. 3A, a functional block diagram depicts a computer network 50 that employs MD5. Network 50 performs the same functions as network 10 that is shown in FIG. 1, however a message digest module 60 employs a looping MD5 calculation module 62. Looping MD5 calculation module 62 employs less computer memory than sequential MD5 calculation module 28 of the prior art.

Examples of a network device 12 include a VoIP telephone, a gaming console, a computer, a television, a digital sound recording player, and the like. Network device 12 executes application layer software that includes a message digest module 20. Message digest module 20 calculates a message digest for network device 12 and sends the message digest to server 14. The message digest is based on a message and uniquely identifies network device 12. Examples of messages include data that is unique to associated users such as e-mail addresses, account numbers, software serial numbers, and the like. The message can also include all or part of digital files and/or memory locations that are included in network device 12 and a challenge 32. Server 14 calculates a message digest based on the message and compares it to the message digest from network device 12. If the message digests match then network device 12 is authorized to use services of server 14. In some embodiments server 14 communicates a challenge phrase to network device 12. The message can then also include the challenge phrase and message digest module 20 then calculates the message digest based in part on the challenge phrase.

Message digest module 20 includes several modules which implement associated steps of RFC 1321. An append bits module 22 appends padding bits to the message in accordance with RFC 1321 §3.1. The padding bits pad or extend the message so that its length in bits is congruent to 448, modulo 512. That is, the message is extended so that it is 64 bits shy of being a multiple of 512 bits long. Padding is always performed, even if the length of the message is already congruent to 448, modulo 512. Padding includes appending a single "1" bit to the message and then appending "0" bits until the length in bits of the padded message becomes congruent to 448, modulo 512.

Message digest module 20 also includes an append length module 24. In accordance with RFC 1321 §3.2, append length module 24 appends a 64-bit representation of b to the padded message. b is the length of the message before the padding bits were added. In the event that b is greater than $2^{64}$, then only the low-order 64 bits of b are used. The bits are appended as two 32-bit words and appended low-order word first. At an output of append length module 24, the length of the resulting message is an exact multiple of 512 bits, i.e. sixteen 32-bit words. The resulting message includes the padding bits and the 64-bit representation of b.

Message digest module 20 also includes an initialization module 26. Initiation module 26 initializes four 32-bit wide, i.e. word, buffers or registers in accordance with RFC 1321 §3.3. The registers are designated as A, B, C, and D and contain the message digest as it is being calculated. Register A is initialized with hexadecimal 01 23 45 67, register B is initialized with hexadecimal 89 ab cd ef, register C is initialized with hexadecimal fe dc ba 98, and register D is initialized with hexadecimal 76 54 32 10.

Looping MD5 calculation module 62 processes the complete message, i.e. the padded message appended with the 64-bit representation of b. The processing calculates the same message digest that would otherwise be calculated using the method set forth RFC 1321 §3.4, however it employs less memory. Looping MD5 calculation module 62 includes a four element array n[0..3]. Each element of the array stores an address &A, &B, &C, and &D of associated memory locations or buffers A, B, C, and D. The processing includes taking one 16-bit block at a time of the complete message and performing sixteen operations for each of four operations that are defined in RFC 1321. To conserve memory, the four operations are dynamically constructed from an array of constants and a normalized equation. Results of the operations are accumulated in buffers A, B, C, and D, which also contain the final message digest after the last 16-bit block is processed.

Figure 3B:
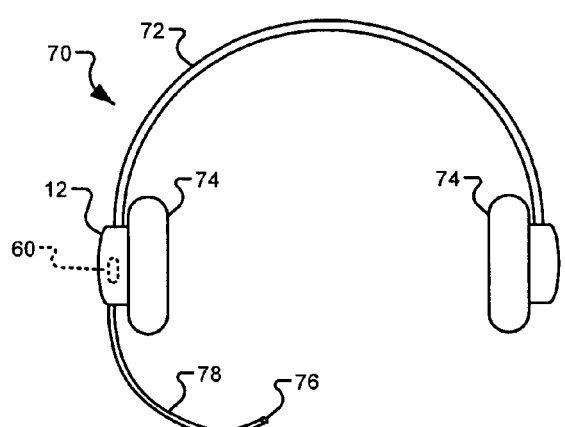
FIG. 3B is a functional block diagram of a wireless VoIP telephone headset according to the principles of the present disclosure.

Referring now to FIG. 3B, one of several embodiments is shown of a wireless VoIP headset 70. Headset 70 includes network device 12 and message digest module 60. Headset 70 may also include a band 72 that positions headset 70 on a user. While an over-the-head band 72 is shown, it should be appreciated that other types of bands may be used as well. Examples of other types of bands include various types of ear clips and behind-the-head bands. Band 72 connects to left and/or right speakers 74 and positions speakers 74 proximate the user's ears. It should be appreciated that a monaural version of headset 70 would have only one speaker 74. A boom 78 extends from a shell that protects speaker 74. A microphone 76 is integral to boom 78.

Figure 4A:
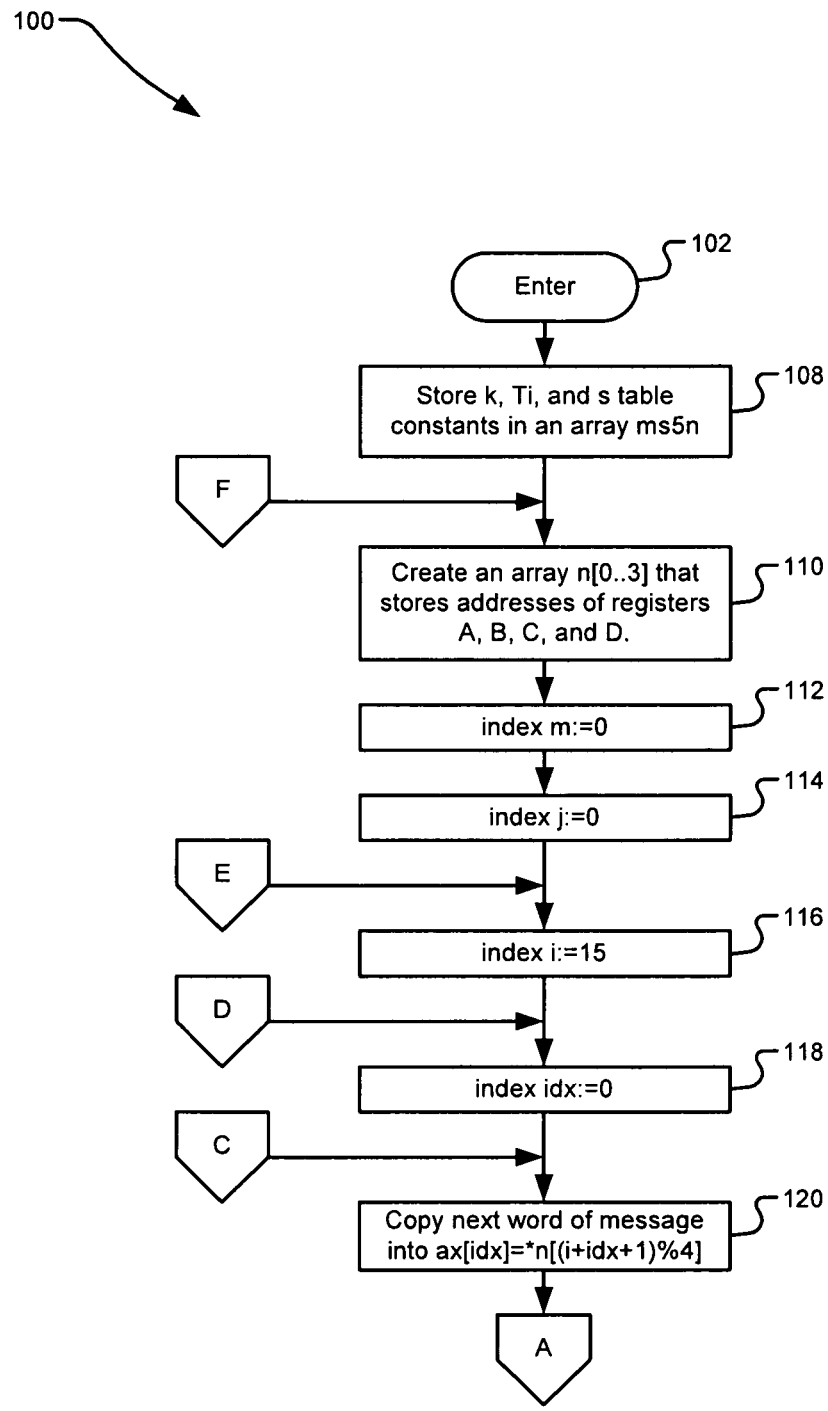
FIGS. 4A-4C are a flowchart of a method that generates message digests according to the principles of the present disclosure.
Figure 4B:
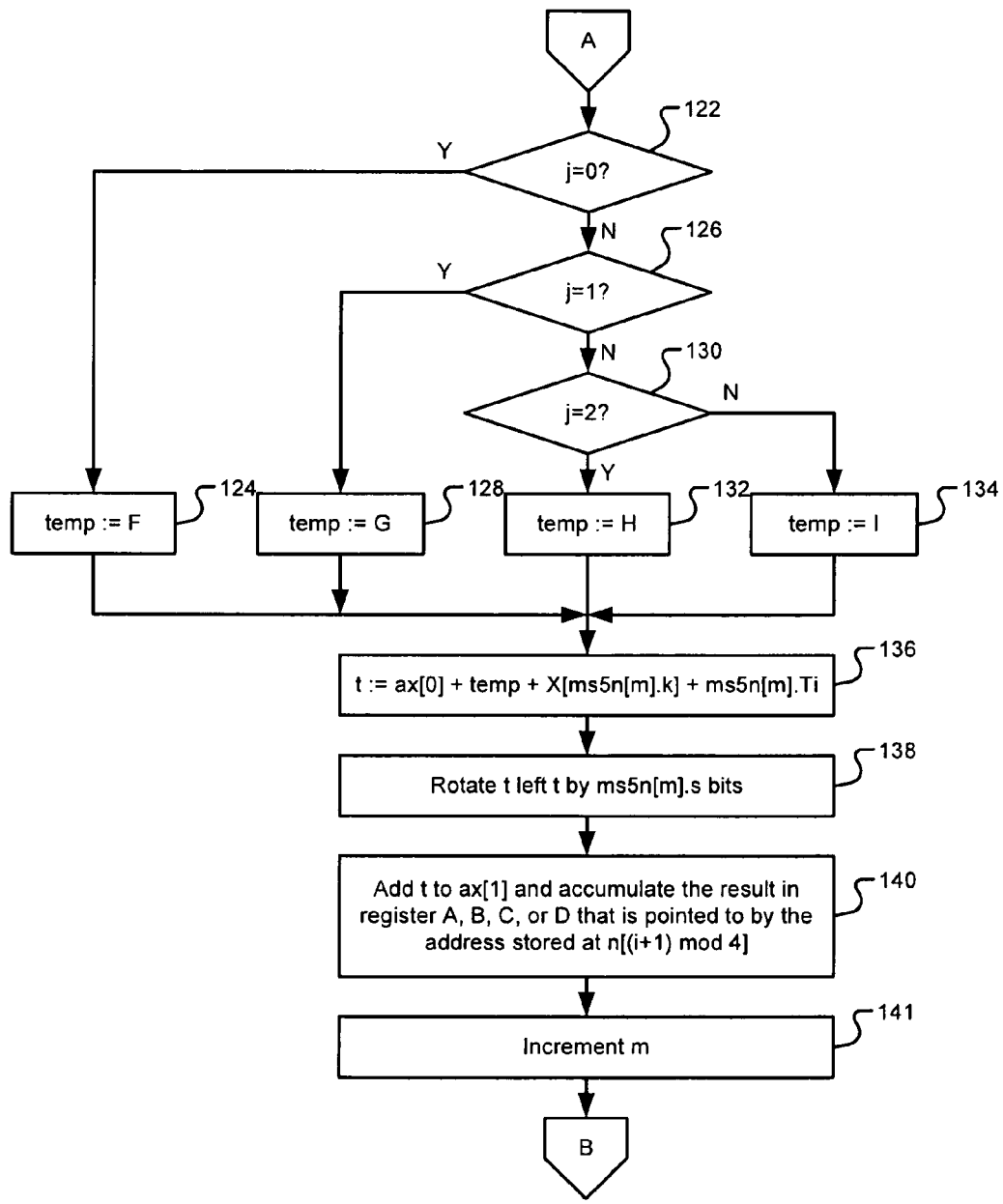
Figure 4C:
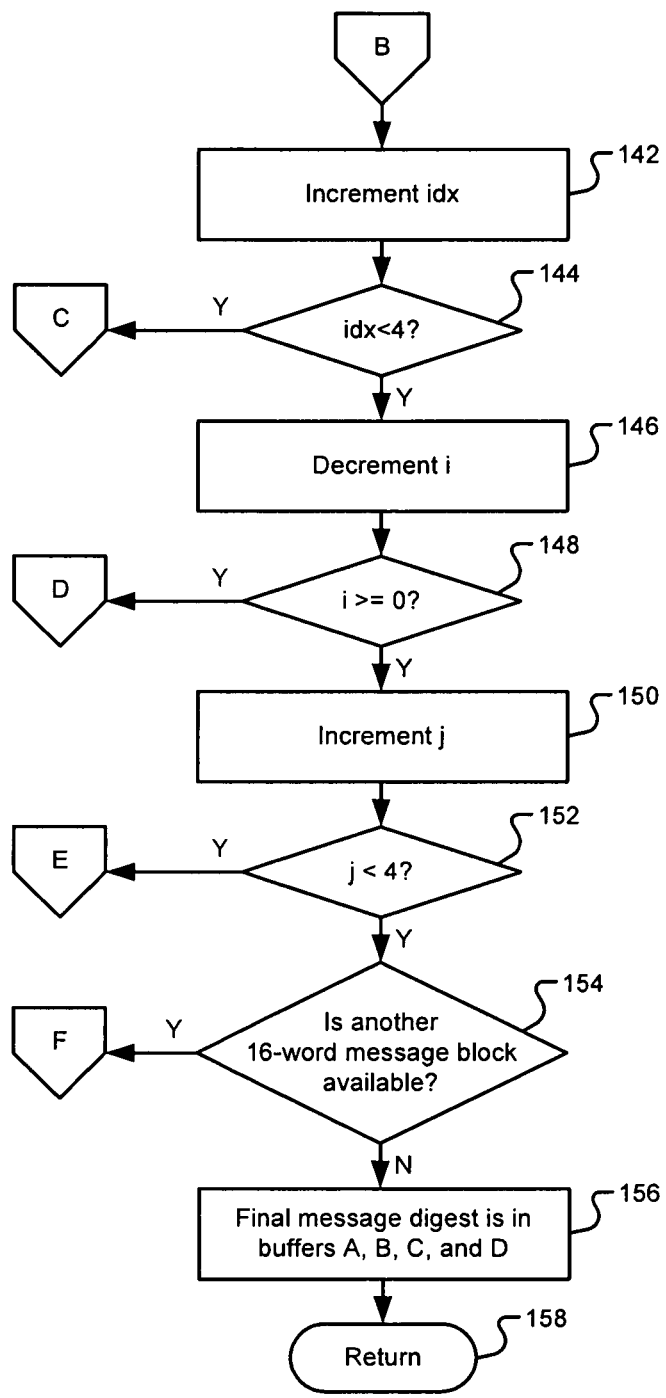

Referring now to FIGS. 4A-4C, a flowchart depicts a method 100 that is executed by looping MD5 calculation module 62. The flowchart includes pairs of page connector labels A through F which connect respective points that appear on different figures of the flowchart. Method 100 calculates a message digest that is compliant with RFC 1321, however it can be implemented with less computer memory than methods of the prior art. Method 100 can therefore be employed in applications where computer memory space is at a premium.

Looping MD5 calculation module 62 receives the complete message and begins executing method 100. Control enters at block 102 and immediately proceeds to block 108. In block 108 control stores in memory a 64×3 element array of constants k, s, and Ti. Table 1 shows an example of the 64×3 element array as it could be encoded in the C programming language. Those skilled in the art can appreciate that other programming languages may also be employed.

TABLE 1

```
struct md5Rd
{
md5_byte_t k;
md5_byte_t s;
md5_word_t Ti;
}ms5n[64]
{
    {0, 7, T1},    {1, 12, T2},    {2, 17, T3},    {3, 22, T4},
    {4, 7, T5},    {5, 12, T6},    {6, 17, T7},    {7, 22, T8},
    {8, 7, T9},    {9, 12, T10},   {10, 17, T11},  {11, 22, T12},
    {12, 7, T13},  {13, 12, T14},  {14, 17, T15},  {15, 22, T16},
    {1, 5, T17},   {6, 9, T18},    {11, 14, T19},  {0, 20, T20},
    {5, 5, T21},   {10, 9, T22},   {15, 14, T23},  {4, 20, T24},
    {9, 5, T25},   {14, 9, T26},   {3, 14, T27},   {8, 20, T28},
    {13, 5, T29},  {2, 9, T30},    {7, 14, T31},   {12, 20, T32},
    {5, 4, T33},   {8, 11, T34},   {11, 16, T35},  {14, 23, T36},
    {1, 4, T37},   {4, 11, T38},   {7, 16, T39},   {10, 23, T40},
    {13, 4, T41},  {0, 11, T42},   {3, 16, T43},   {6, 23, T44},
    {9, 4, T45},   {12, 11, T46},  {15, 16, T47},  {2, 23, T48},
    {0, 6, T49},   {7, 10, T50},   {14, 15, T51},  {5, 21, T52},
    {12, 6, T53},  {3, 10, T54},   {10, 15, T55},  {1, 21, T56},
    {8, 6, T57},   {15, 10, T58},  {6, 15, T59},   {13, 21, T60},
    {4, 6, T61},   {11, 10, T62},  {2, 15, T63},   {9, 21, T64},
};
```

In some embodiments the array is stored in read-only memory, random access memory, or both. Choice of employing a particular type of memory can be based on amount of each type of memory that is available to use in a particular application, memory access speed, and so forth. The constants k represent indexes into a block of the message. The constants s represent shift counts. The constants Ti represent table entries of MD5 transforms that are defined in a 64-element table MD5Transform. Entries of the MD5Transform function are disclosed in RFC 1321. Each entry represents an integer part of 4294967296*abs(sin(i)), where i is in radians.

Control proceeds to block 110 and creates four element array n[0..3] in memory. Each element of the array n[0..3] stores an address &A, &B, &C, and &D of associated buffers A, B, C, and D. Buffers A, B, C, and D are each 32-bits wide. Control then proceeds to blocks 112 and 114 and initializes indexes m and j to zero. Control then proceeds to block 116 and initializes an index i to 15. Control then proceeds to block 120 and loads a 16-word block of the message into a memory location ax. The value for ax may be obtained as ax[idx]=*n[(I+idx+1)%4], where % represents the modulus operator.

Control proceeds from block 120 to decision block 122. In decision block 122 control determines whether j is equal to zero. If so, then control branches to block 124 and assigns a function F to the function named temp. Returning to decision block 122, if j is not equal to 0 then control branches to decision block 126. In decision block 126 control determines whether j is equal to 1. If so, then control branches to block 128 and assigns a function G to temp. Returning to decision block 126, if j is not equal to 1 then control branches to decision block 130. In decision block 130 control determines whether j is equal to 2. If so, then control branches to block 132 and assigns a function H to the temp. Otherwise control branches to block 134 and assigns a function I to temp. Table 2 shows an example of the functions F, G, H, and I, and method 100, as they could be encoded in the C programming language. Those skilled in the art can appreciate that other programming languages may also be employed.

TABLE 2

```
#define F(x, y, z) (((x) & (y)) | (~(x) & (z)))
#define G(x, y, z) (((x) & (z)) | ((y) & ~(z)))
#define H(x, y, z) ((x) ^ (y) ^ (z))
#define I(x, y, z) ((y) ^ ((x) | ~(z)))
  md5_word_t *n[4];
  md5_word_t temp;
  int i,j,m;
  n[0] = &a;
  n[1] = &b;
  n[2] = &c;
  n[3] = &d;
  m=0;
  for(j=0; j<4; j++)
  {
    for(i=15; i>=0; i--)
    {
      md5_word_t ax[4], idx;
      for(idx=0;idx<4;idx++)
        ax[idx]=*n[(i+idx+1)%4];
      switch(j)
      {
      case 0: temp=F(ax[1], ax[2], ax[3]);
        break;
      case 1: temp=G(ax[1], ax[2], ax[3]);
        break;
      case 2: temp=H(ax[1], ax[2], ax[3]);
        break;
      case 3: temp=I(ax[1], ax[2], ax[3]);
        break;
      }
      t = ax[0] + temp + X[(ms5n[m] .k)] + ms5n[m] .Ti;
      *n[(i+1)%4] = ROTATE_LEFT(t, (ms5n[m] .s)) + ax[1];
      m++;
    }
  }
```

Control branches to block 136 from one of blocks 124, 128, 132, and 134. In block 136 control solves an equation t, where $$t = ax[0] + \text{temp} + X[ms5n[m] \cdot k] + ms5n[m] \cdot Ti.$$

Equation t represents a normalized subset of four equations that are specified in RFC 1321 §3.4. The equations are $$a = (b + ((a + F(b,c,d)X[k] + T[i]) <<< s),$$

$$a = (b + ((a + G(b,c,d)X[k] + T[i]) <<< s),$$

$$a = (b + ((a + H(b,c,d)X[k] + T[i]) <<< s, \text{ and}$$

$$a = (b + ((a + I(b,c,d)X[k] + T[i]) <<< s,$$

wherein RFC 1321 §3.4 specifies values for each of variables a, b, c, d, k, i, and s. X is an array that holds the complete message. Terms of equation t are provided by the least significant byte, ax[0], of the message word that is being processed, the equation temp, the ms5n[m].k element of the 64×3 matrix, and the ms5n[m].Ti element of the 64×3 matrix. Control then proceeds to block 138 and left barrel shifts the result of block 136, i.e. equation t, by the number of bits pointed to by the ms5n[m].s element of the 64×3 matrix. Control then branches to block 140 and adds the result of block 138 to ax[1], which is the second least significant byte for the message word that is being processed. The sum is then stored in the register A, B, C, or D that is pointed to by the address stored at n[(i+1) mod 4]. Control then proceeds to block 141 and increments index m.

Control proceeds from block 141 to block 142. In block 142 control increments index idx and then branches to decision block 144. In decision block 144 control determines whether index idx is less than 4. If so, then control branches back to block 120 and begins processing the next message word. If idx is greater than or equal to 4 then control branches to block 146 and decrements index i. Control then branches to decision block 148 and determines whether i is greater than or equal to zero. If i is greater than or equal to zero, then control branches back to block 118. If i is less than zero then control branches to block 150 and increments index j. Control then proceeds to decision block 154 and determines whether j is less than 4. If so, then control branches back to block 116. If j is greater than or equal to 4 then control branches to decision block 154. In decision block 154 control determines whether another message block is available for processing. If so, then control branches back to block 110. If there is not another message block available then the MD5 hash is complete. Control branches to block 156 and reads the final message digest from buffers A, B, C, and D. Control then returns to other processes via block 158.

Referring now to FIGS. 5A-5G, various exemplary implementations incorporating the teachings of the present disclosure are shown.

Figure 5A:
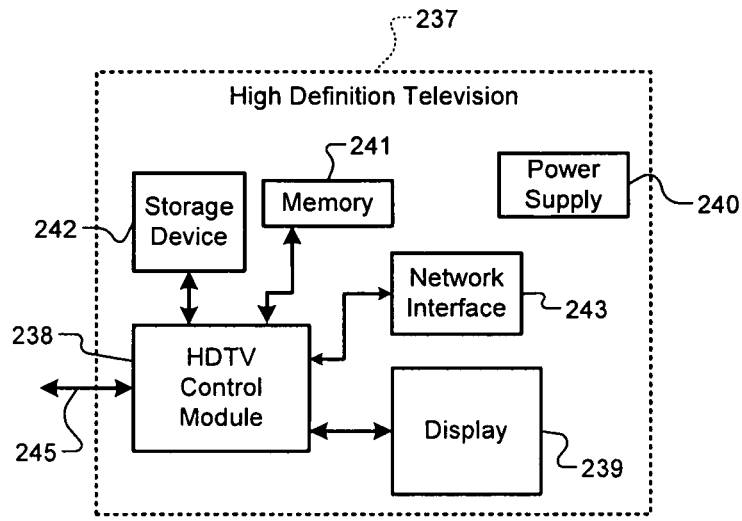
FIG. 5A is a functional block diagram of a high definition television according to the principles of the present disclosure.

Referring now to FIG. 5A, message digest module 60 can be implemented in a network interface 243 of a high definition television (HDTV) 237. The HDTV 237 includes an HDTV control module 238, a display 239, a power supply 240, memory 241, a storage device 242, network interface 243, and an external interface 245. If the network interface 243 includes a wireless local area network interface, an antenna (not shown) may be included.

The HDTV 237 can receive input signals from the network interface 243 and/or the external interface 245, which can send and receive data via cable, broadband Internet, and/or satellite. The HDTV control module 238 may process the input signals, including encoding, decoding, filtering, and/or formatting, and generate output signals. The output signals may be communicated to one or more of the display 239, memory 241, the storage device 242, the network interface 243, and the external interface 245.

Memory 241 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 242 may include an optical storage drive, such as a DVD drive, and/or a hard disk drive (HDD). The HDTV control module 238 communicates externally via the network interface 243 and/or the external interface 245. The power supply 240 provides power to the components of the HDTV 237.

Figure 5B:
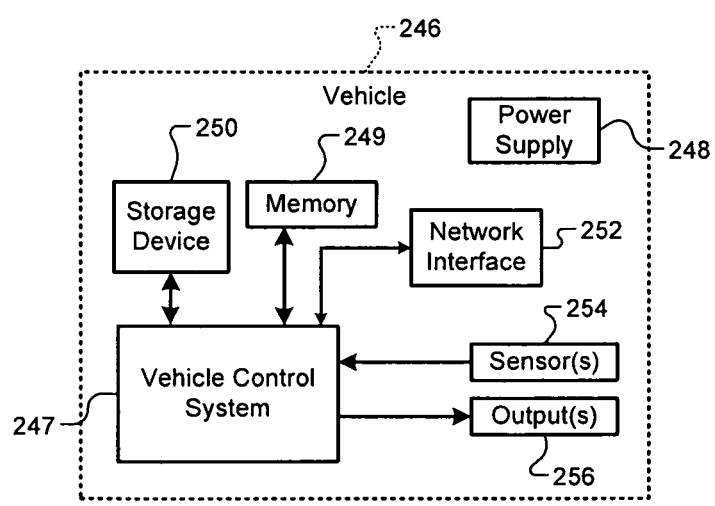
FIG. 5B is a functional block diagram of a vehicle control system according to the principles of the present disclosure.

Referring now to FIG. 5B, message digest module 60 may be implemented in a network interface 252 of a vehicle 246. The vehicle 246 may include a vehicle control system 247, a power supply 248, memory 249, a storage device 250, and network interface 252. If the network interface 252 includes a wireless local area network interface, an antenna (not shown) may be included. The vehicle control system 247 may be a powertrain control system, a body control system, an entertainment control system, an anti-lock braking system (ABS), a navigation system, a telematics system, a lane departure system, an adaptive cruise control system, etc.

The vehicle control system 247 may communicate with one or more sensors 254 and generate one or more output signals 256. The sensors 254 may include temperature sensors, acceleration sensors, pressure sensors, rotational sensors, airflow sensors, etc. The output signals 256 may control engine operating parameters, transmission operating parameters, suspension parameters, etc.

The power supply 248 provides power to the components of the vehicle 246. The vehicle control system 247 may store data in memory 249 and/or the storage device 250. Memory 249 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 250 may include an optical storage drive, such as a DVD drive, and/or a hard disk drive (HDD). The vehicle control system 247 may communicate externally using the network interface 252.

Figure 5C:
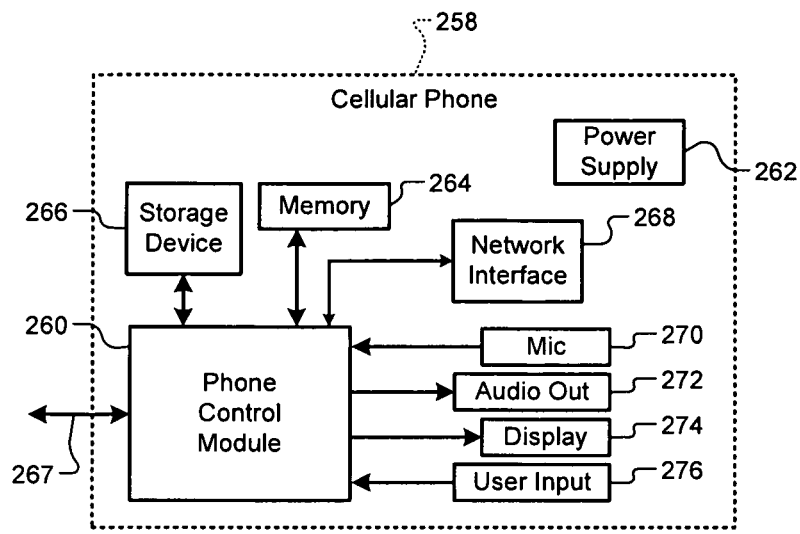
FIG. 5C is a functional block diagram of a cellular phone according to the principles of the present disclosure.

Referring now to FIG. 5C, message digest module 60 can be implemented in a network interface 268 of a cellular phone 258. The cellular phone 258 includes a phone control module 260, a power supply 262, memory 264, a storage device 266, and a cellular network interface 267. The cellular phone 258 also includes network interface 268, a microphone 270, an audio output 272 such as a speaker and/or output jack, a display 274, and a user input device 276 such as a keypad and/or pointing device. If the network interface 268 includes a wireless local area network interface, an antenna (not shown) may be included.

The phone control module 260 may receive input signals from the cellular network interface 267, the network interface 268, the microphone 270, and/or the user input device 276. The phone control module 260 may process signals, including encoding, decoding, filtering, and/or formatting, and generate output signals. The output signals may be communicated to one or more of memory 264, the storage device 266, the cellular network interface 267, the network interface 268, and the audio output 272.

Memory 264 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 266 may include an optical storage drive, such as a DVD drive, and/or a hard disk drive (HDD). The power supply 262 provides power to the components of the cellular phone 258.

Figure 5D:
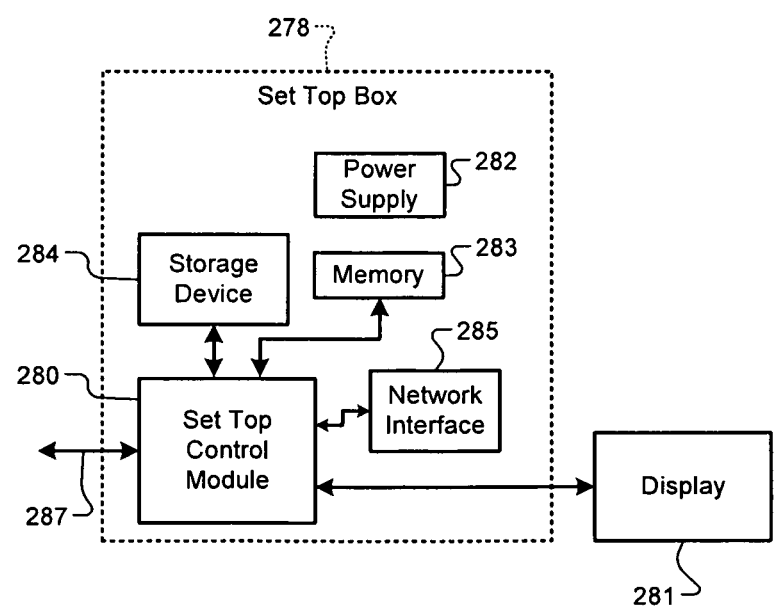
FIG. 5D is a functional block diagram of a set top box according to the principles of the present disclosure.

Referring now to FIG. 5D, message digest module 60 can be implemented in a network interface 285 of a set top box 278. The set top box 278 includes a set top control module 280, a display 281, a power supply 282, memory 283, a storage device 284, and a network interface 285. If the network interface 285 includes a wireless local area network interface, an antenna (not shown) may be included.

The set top control module 280 may receive input signals from the network interface 285 and an external interface 287, which can send and receive data via cable, broadband Internet, and/or satellite. The set top control module 280 may process signals, including encoding, decoding, filtering, and/or formatting, and generate output signals. The output signals may include audio and/or video signals in standard and/or high definition formats. The output signals may be communicated to the network interface 285 and/or to the display 281. The display 281 may include a television, a projector, and/or a monitor.

The power supply 282 provides power to the components of the set top box 278. Memory 283 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 284 may include an optical storage drive, such as a DVD drive, and/or a hard disk drive (HDD).

Figure 5E:
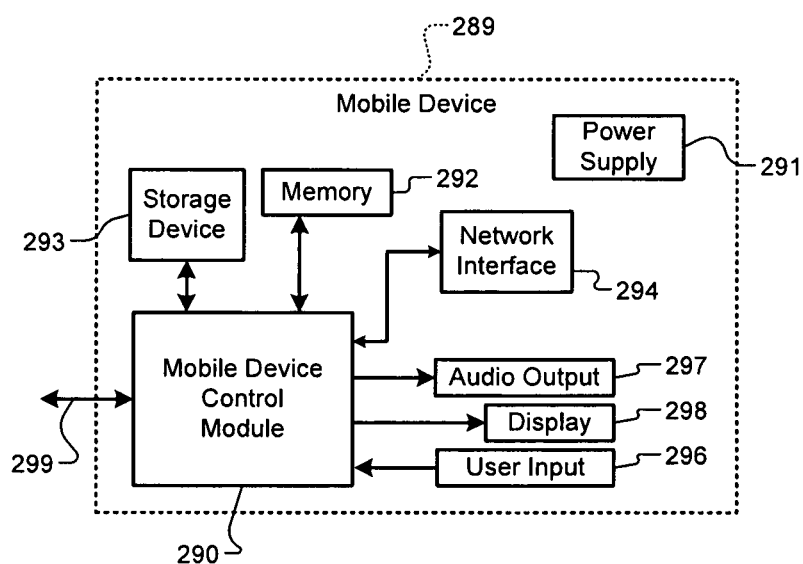
FIG. 5E is a functional block diagram of a mobile device according to the principles of the present disclosure.

Referring now to FIG. 5E, message digest module 60 can be implemented in a network interface 294 of a mobile device 289. The mobile device 289 may include a mobile device control module 290, a power supply 291, memory 292, a storage device 293, a network interface 294, and an external interface 299. If the network interface 294 includes a wireless local area network interface, an antenna (not shown) may be included.

The mobile device control module 290 may receive input signals from the network interface 294 and/or the external interface 299. The external interface 299 may include USB, infrared, and/or Ethernet. The input signals may include compressed audio and/or video, and may be compliant with the MP3 format. Additionally, the mobile device control module 290 may receive input from a user input 296 such as a keypad, touchpad, or individual buttons. The mobile device control module 290 may process input signals, including encoding, decoding, filtering, and/or formatting, and generate output signals.

The mobile device control module 290 may output audio signals to an audio output 297 and video signals to a display 298. The audio output 297 may include a speaker and/or an output jack. The display 298 may present a graphical user interface, which may include menus, icons, etc. The power supply 291 provides power to the components of the mobile device 289. Memory 292 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 293 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A network device, comprising:
   an append bits module to generate a padded message by appending padding bits to a first message;
   an append length module to generate a second message by appending length data to the padded message, the length data representing an amount of data in the first message;
   an initialization module to store predetermined values in buffers;
   an array to store constants; and
   a looping message-digest calculation module to generate a first message digest in response to (i) the first message, (ii) the padding bits, (iii) the length data, (iv) the predetermined values in the buffers, and (v) the constants, wherein:
   the first message digest corresponds to the first message,
   the looping message-digest calculation module generates the first message digest by executing a plurality of iterations of a first portion of code,
   in each iteration of the plurality of iterations of the first portion of code, the looping message-digest calculation module:
      selects a different one of a predefined plurality of functions for use in the iteration,
      calculates a set of values based on evaluating the selected one of the predefined plurality of functions using data from the buffers, and
      updates the buffers based on the set of values, and
   the looping message-digest calculation module outputs the first message digest based on final results in the buffers after executing the plurality of iterations of the first portion of code.

2. The network device of claim 1, wherein each element of the array includes a constant corresponding to an index into the second message.

3. The network device of claim 2, wherein each element of the array further includes a constant corresponding to a transform value and a constant corresponding to a shift quantity.

4. A voice over internet protocol (VOIP) headset comprising the network device of claim 1.

5. The network device of claim 1, wherein the buffers of the network device include four buffers that are each 32-bits wide.

6. The network device of claim 1, wherein:
   the predefined plurality of functions comprises four functions, and
   each of the four functions is a function of three inputs and is defined by a different sequence of bitwise parallel Boolean operators.

7. The network device of claim 1, wherein:
   the first portion of code includes a second portion of code, in each iteration of the plurality of iterations of the first portion of code, the looping message-digest calculation module executes a plurality of iterations of the second portion of code, and
   in each iteration of the plurality of iterations of the second portion of code, the looping message-digest calculation module:
      calculates one of the set of values based on evaluating the selected one of the predefined plurality of functions using data from the buffers, and
      updates one of the buffers based on the one of the set of values.

8. The network device of claim 7, wherein:
   each element of the array includes an index value, and
   in each iteration of the plurality of iterations of the second portion of code, the looping message-digest calculation module calculates the one of the set of values based on a sum of (i) a portion of the second message selected according to an index value from a respective element of the array and (ii) a result of evaluating the selected one of the predefined plurality of functions using data from the buffers.

9. The network device of claim 7, wherein:
   each element of the array includes a shift quantity, and
   in each iteration of the plurality of iterations of the second portion of code, the looping message-digest calculation module calculates the one of the set of values based on a barrel shift of
      (i) a result of evaluating the selected one of the predefined plurality of functions using data from the buffers
      by
      (ii) a number of bits specified by a shift quantity from a respective element of the array.

10. The network device of claim 7, further comprising a second array to store addresses of the buffers.

11. The network device of claim 10, wherein the looping message-digest calculation module indexes into the second array according to a modulo four operation on an integer that is adjusted after each of the plurality of iterations of the second portion of code.

12. The network device of claim 7, wherein:
   each element of the array includes a transformation value, and
   in each iteration of the plurality of iterations of the second portion of code, the looping message-digest calculation module calculates the one of the set of values based on a sum of (i) a transformation value from a respective element of the array and (ii) a result of evaluating the selected one of the predefined plurality of functions using data from the buffers.

13. A method of operating a network device, the method comprising:
   appending padding bits to a first message to form a padded message;
   appending length data to the first message to form a second message, wherein the length data represents an amount of data in the first message;
   storing predetermined values in buffers of the network device;
   storing an array of constants;
   generating a first message digest, in the buffers of the network device, in response to the first message, the padding bits, the length data, the predetermined values, and the array of constants,
   wherein the first message digest corresponds to the first message, wherein generating the first message digest includes executing a plurality of iterations of a first portion of code, and wherein performing each iteration of the first portion of code includes:
  selecting a different one of a predefined plurality of functions for use in the iteration,
  calculating a set of values based on evaluating the selected one of the predefined plurality of functions using data from the buffers, and
  updating the buffers based on the set of values; and outputting the first message digest based on final results in the buffers after executing the plurality of iterations of the first portion of code.

14. The method of claim 13, wherein each element of the array includes a constant corresponding to an index into the second message.

15. The method of claim 14, wherein each element of the array further includes a constant corresponding to a transform and a constant corresponding to a shift quantity.

16. The method of claim 13, further comprising storing 32-bits in each of four of the buffers of the network device.

17. The method of claim 13, further comprising providing a voice over internet protocol (VOIP) headset to employ the first message digest, wherein the VOIP headset includes the network device.

18. The method of claim 13, wherein:
  the predefined plurality of functions comprises four functions, and
  each of the four functions is a function of three inputs and is defined by a different sequence of bitwise parallel Boolean operators.

19. The method of claim 13, wherein the first portion of code includes a second portion of code and wherein the method further comprises:
  in each iteration of the plurality of iterations of the first portion of code, executing a plurality of iterations of the second portion of code; and
  in each iteration of the plurality of iterations of the second portion of code:
    calculating one of the set of values based on evaluating the selected one of the predefined plurality of functions using data from the buffers, and
    updating one of the buffers based on the one of the set of values.

20. The method of claim 19, wherein each element of the array includes an index value, and wherein the method further comprises:
  in each iteration of the plurality of iterations of the second portion of code, calculating the one of the set of values based on a sum of (i) a portion of the second message selected according to an index value from a respective element of the array and (ii) a result of evaluating the selected one of the predefined plurality of functions using data from the buffers.

21. The method of claim 19, wherein each element of the array includes a shift quantity, and wherein the method further comprises:

in each iteration of the plurality of iterations of the second portion of code, calculating the one of the set of values based on a barrel shift of
  (i) a result of evaluating the selected one of the predefined plurality of functions using data from the buffers
  by
  (ii) a number of bits specified by a shift quantity from a respective element of the array.

22. The method of claim 19, wherein each element of the array includes a transformation value, and wherein the method further comprises:
  in each iteration of the plurality of iterations of the second portion of code, calculating the one of the set of values based on a sum of (i) a transformation value from a respective element of the array and (ii) a result of evaluating the selected one of the predefined plurality of functions using data from the buffers.

23. The method of claim 19, further comprising storing addresses of the buffers of the network device into a second array.

24. The method of claim 23, further comprising indexing into the second array according to a modulo four operation on an integer that is adjusted after each of the plurality of iterations of the second portion of code.

25. A non-transitory computer-readable medium comprising instructions including:
  appending padding bits to a first message to form a padded message;
  appending length data to the first message to form a second message, wherein the length data represents an amount of data in the first message;
  storing predetermined values in buffers;
  storing an array of constants;
  generating a first message digest, in the buffers, in response to the first message, the padding bits, the length data, the predetermined values, and the array of constants,
  wherein the first message digest corresponds to the first message,
  wherein generating the first message digest includes executing a plurality of iterations of a first portion of code, and
  wherein performing each iteration of the first portion of code includes:
    selecting a different one of a predefined plurality of functions for use in the iteration,
    calculating a set of values based on evaluating the selected one of the predefined plurality of functions using data from the buffers, and
    updating the buffers based on the set of values; and
  outputting the first message digest based on final results in the buffers after executing the plurality of iterations of the first portion of code.

* * * * *